United States Patent [19]
Ihm

[11] Patent Number: 5,620,042
[45] Date of Patent: Apr. 15, 1997

[54] METHOD OF CASTING A COMPOSITE DISC BRAKE ROTOR

[75] Inventor: Mark K. Ihm, Mt. Clemens, Mich.

[73] Assignee: Kelsey-Hayes Company, Romulus, Mich.

[21] Appl. No.: 636,255

[22] Filed: Apr. 23, 1996

Related U.S. Application Data

[63] Continuation-in-part of Ser. No. 356,031, Dec. 14, 1994, Pat. No. 5,509,510, which is a continuation of Ser. No. 85,712, Jun. 30, 1993, abandoned.

[51] Int. Cl.[6] .................................................. B22D 19/00
[52] U.S. Cl. ............................ 164/95; 164/98; 164/111; 164/112
[58] Field of Search ........................ 164/94, 95, 97, 164/98, 111, 112

[56] References Cited

U.S. PATENT DOCUMENTS

| | | |
|---|---|---|
| 3,724,613 | 4/1973 | Bermingham . |
| 3,732,953 | 5/1973 | Huet . |
| 4,819,769 | 4/1989 | Metzler et al. . |
| 4,907,677 | 3/1990 | Yamashita et al. . |
| 5,183,632 | 2/1993 | Kiuchi et al. . |
| 5,184,663 | 2/1993 | Oono et al. . |
| 5,301,774 | 4/1994 | Cho et al. ............................ 164/98 X |

FOREIGN PATENT DOCUMENTS

| | | | |
|---|---|---|---|
| 0351237 | 1/1990 | European Pat. Off. . | |
| 1580381 | 9/1969 | France | 164/98 |
| 2109888 | 5/1972 | France . | |
| 4220728 | 1/1993 | Germany . | |
| 60-18265 | 1/1985 | Japan | 164/98 |
| 62-72459 | 4/1987 | Japan | 164/98 |
| 62-233531 | 10/1987 | Japan . | |
| 1-321067 | 12/1989 | Japan | 164/98 |
| 2024346 | 1/1980 | United Kingdom . | |
| 2228053 | 8/1990 | United Kingdom . | |
| WO89/09889 | 10/1989 | WIPO . | |

*Primary Examiner*—J. Reed Batten, Jr.
*Attorney, Agent, or Firm*—MacMillan, Sobanski & Todd

[57] ABSTRACT

A generally annular rotor insert is formed by casting a metal matrix composite. The rotor insert includes a pair of brake friction plates which are disposed in mutually spaced apart relationship. The brake friction plates include inner surfaces and generally parallel outer surfaces. At least one of the inner surfaces of the brake friction plates is provided with a plurality of spacing elements for engagement with the inner surface of the other one of the brake friction plates for maintaining the plates in predetermined spaced apart relationship. The rotor insert is placed in a rotor mold. A hat-shaped rotor body is cast in the rotor mold whereby the spacing elements are effective to maintain the plates in a predetermined spaced apart relationship.

9 Claims, 6 Drawing Sheets

FIG. 1

PRIOR ART

FIG. 3

PRIOR ART

METHOD OF CASTING A COMPOSITE DISC BRAKE ROTOR

CROSS-REFERENCE TO RELATED APPLICATIONS

This application is a continuation-in-part of Ser. No. 08/356,031, filed Dec. 14, 1994, and now U.S. Pat. No. 5,509,510, which is a continuation of Ser. No. 08/085,712, filed Jun. 30, 1993, and now abandoned.

BACKGROUND OF THE INVENTION

This invention relates in general to vehicle brakes and, in particular, to an improved composite disc brake rotor for use in a disc brake assembly, and to an improved casting method for producing such a rotor.

A typical disc brake rotor is formed from grey east iron during a sand mold casting process. The rotor includes a generally hat-shaped body, and an outer annular section which are integrally cast as one-piece during the casting process. This kind of rotor is commonly referred to as a "full cast" rotor.

The hat-shaped body includes a mounting surface having a centrally locating pilot hole formed therein during casting, and a plurality of lug bolt receiving apertures equally spaced circumferentially about the pilot hole. The lug bolt receiving apertures are formed during a machining operation. The outer annular section of the rotor includes two parallel outer surfaces which define a pair of brake friction surfaces. The brake friction surfaces can be cast as a single solid brake friction plate, or can be cast as a pair of brake friction plates disposed in a mutually spaced apart relationship by a plurality of ribs or fins to produce a vented rotor. In some instances, the rotor is formed with an integrally cast hub, and is referred to as a "uni-cast" rotor.

While grey cast iron rotors generally possess sufficient mechanical and thermal properties to satisfy requirements of disc brake systems, they are relatively heavy and, for passenger car and light truck applications, can each weigh up to approximately 30 pounds. Since rotors are considered rotating mass and unsprung mass as well as being part of the total mass of the vehicle, the weight of the rotor adversely affects the performance and fuel economy of a vehicle.

To produce a lightweight rotor, it has been suggested to cast the rotor from an aluminum alloy, such as 319 or 356 aluminum. However, while aluminum alloy rotors possess satisfactory thermal properties, they do not possess adequate mechanical properties of high temperature strength, hardness, and wear resistance, which are typically required for disc brake applications. In order to satisfy these mechanical properties and still produce a lightweight rotor, it is known to cast the rotor from an aluminum based metal matrix composite (MMC) containing silicon carbide particulate reinforcement. Such an aluminum MMC is commercially available under the name DURALCAN, a registered trademark of Alcan Aluminum Limited of San Diego, Calif.

The aluminum MMC provides the finished rotor with sufficient mechanical and thermal properties to satisfy the requirements of brake rotor designs at a significantly reduced weight. For example, it has been found that a weight reduction of approximately 60% over a comparable grey cast iron rotor can be achieved by casting the rotor from the aluminum MMC.

One disadvantage to castings made with the aluminum MMC is that they are rather expensive compared to the costs of castings made from grey cast iron and conventional aluminum alloys. Another disadvantage is that the very hard particulate reinforcement makes the aluminum MMC castings more difficult to machine compared to grey iron and conventional aluminum castings.

U.S. Pat. No. 5,183,632 to Kiuchi et al. discloses a method for producing an aluminum "composite" disc brake rotor in which only the friction plate portions are formed of a reinforced aluminum alloy, while the remainder of the rotor is an aluminum alloy. According to this method, an aluminum alloy is first cast or press molded to form a rough-shaped disc brake rotor body. Next, an annular recessed portion (corresponding to the friction plate portions) is formed in each rotor face by machining. A separate reinforced aluminum alloy powder preform or a mixture of an aluminum alloy powder and reinforcing particles is then placed in each of the recessed portions of the rotor. The rotor body including the preform or mixture is heated to mashy state temperature, and then molded under pressure to secure the preform or mixture to the rotor body and produces a rough-shaped disc brake rotor.

SUMMARY OF THE INVENTION

This invention relates to an improved composite disc brake rotor and method for producing the same. The composite rotor includes a generally annular rotor insert formed from a MMC which is cast in situ with a generally hat-shaped rotor body formed from an alloy. In the preferred embodiment, the rotor insert is formed from an aluminum based alloy containing silicon carbide particulate reinforcement and the rotor body is formed from a conventional aluminum alloy, such as 356 aluminum. The rotor body includes a generally centrally located mounting surface, and a radially outwardly extending annular portion. The rotor insert includes a pair of brake friction plates which are disposed in mutually spaced apart relationship. The brake friction plates include inner surfaces and generally parallel outer surfaces. The outer surfaces of the brake friction plates define a pair of brake friction surfaces adapted to be frictionally engaged by a pair of friction pads of a disc brake assembly. In accordance with the present invention, at least one of the inner surfaces of the brake friction plates is provided with a plurality of spacing elements for engagement with the inner surface of the other one of the brake friction plates for maintaining the plates in predetermined spaced apart relationship when the rotor body is cast in situ therewith.

The method for producing the composite disc brake rotor comprises the steps of initially casting the rotor insert, placing the rotor insert in a rotor mold, and casting the hat-shaped rotor body in the rotor mold whereby the spacing elements are effective to maintain the plates in a predetermined spaced apart relationship.

As a result of forming the composite rotor in this manner, the spacing elements maintain a predetermined spacing between the outer surfaces of the plates after the rotor body is cast in situ therewith, and control tolerances to minimize machining. Additionally, the spacing elements improve the metallurgical and mechanical bonds between the rotor insert and the rotor body.

Other advantages of this invention will become apparent to those skilled in the art from the following detailed description of the preferred embodiment, when read in light of the accompanying drawing.

DETAILED DESCRIPTION OF THE PREFERRED EMBODIMENT

Figure 1:
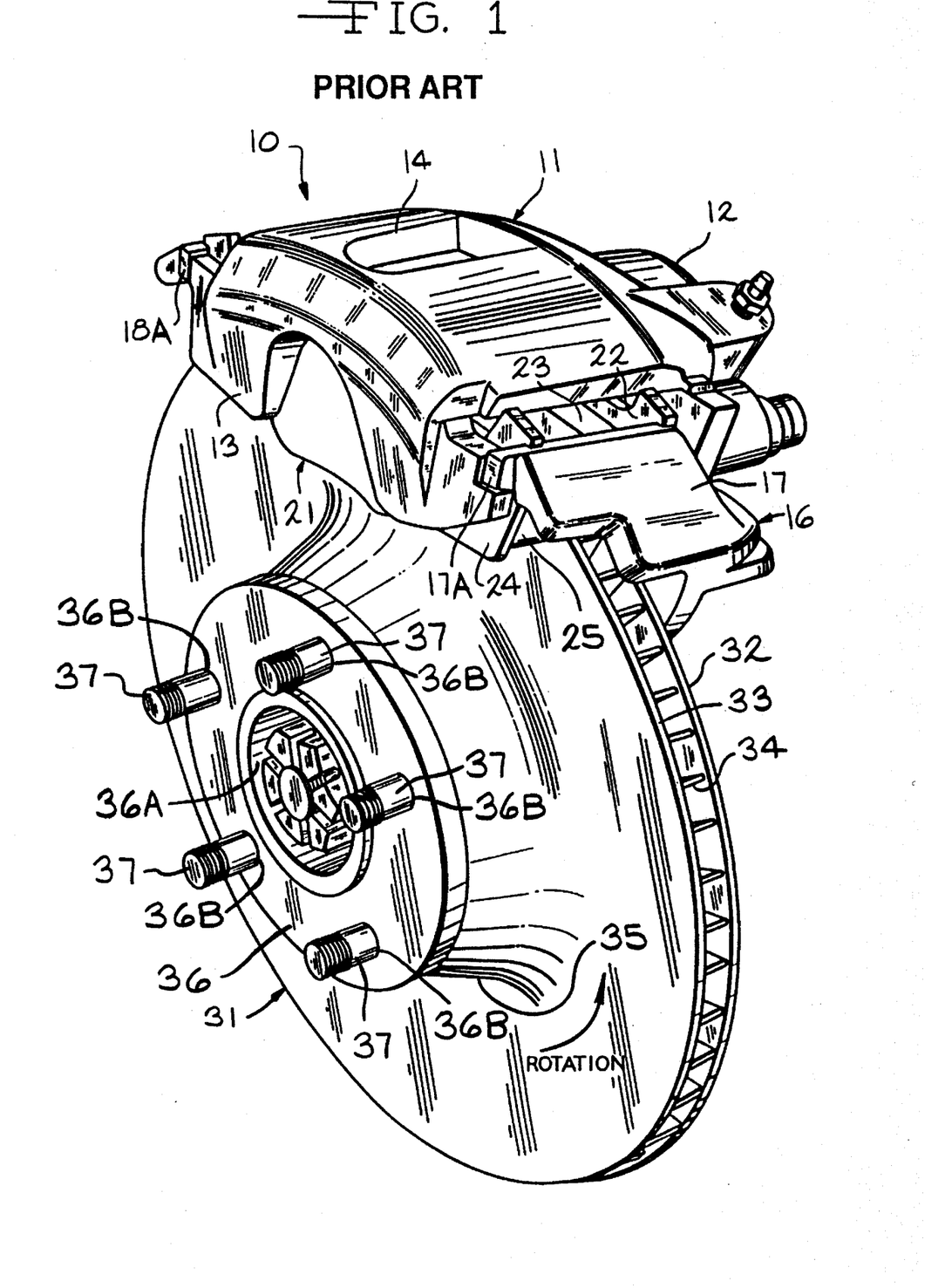
FIG. 1 is a perspective view of a portion of a prior art vehicle disc brake assembly.
Figure 2:
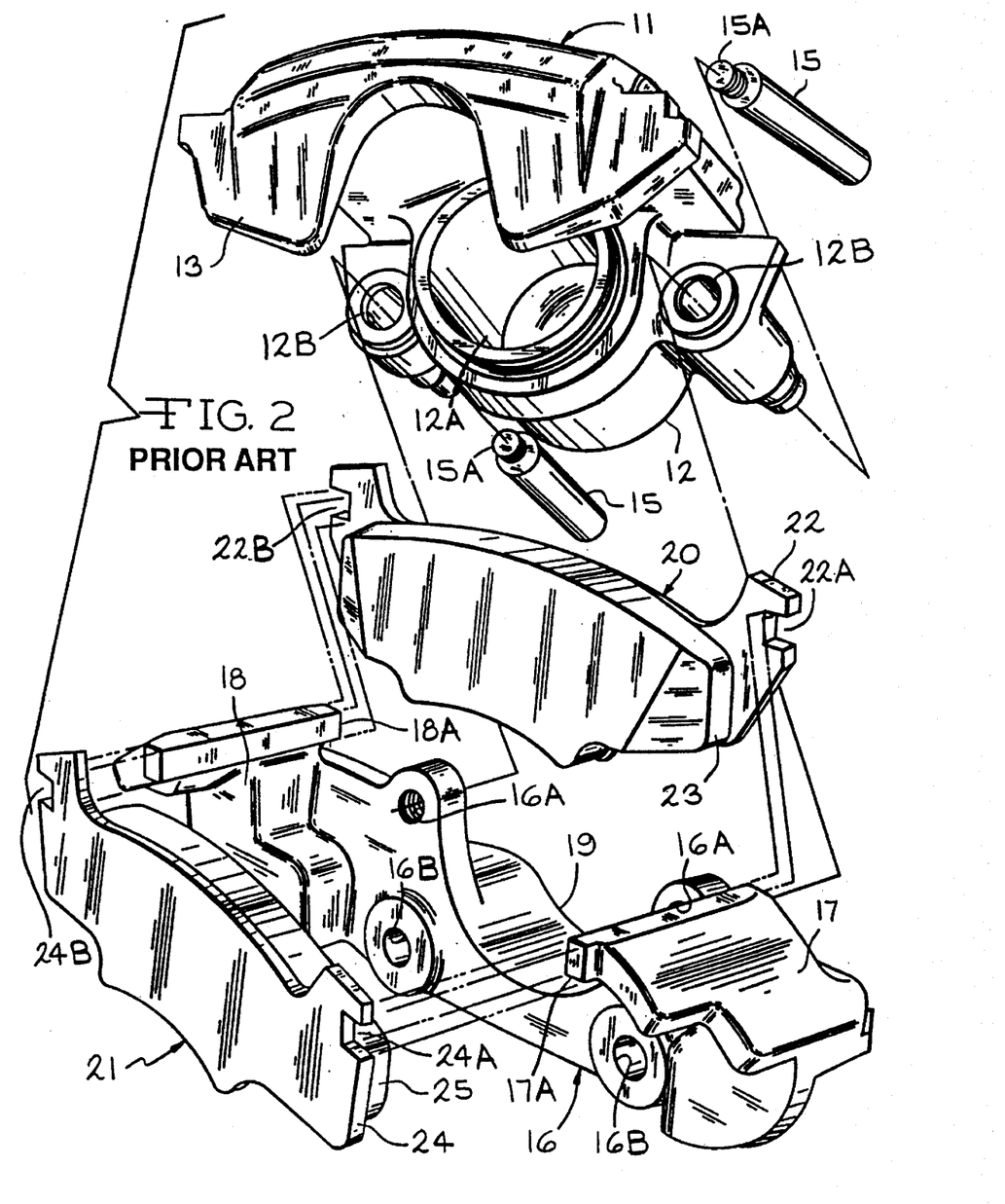
FIG. 2 is an exploded perspective view of a portion of the disc brake assembly illustrated in FIG. 1.
Figure 3:
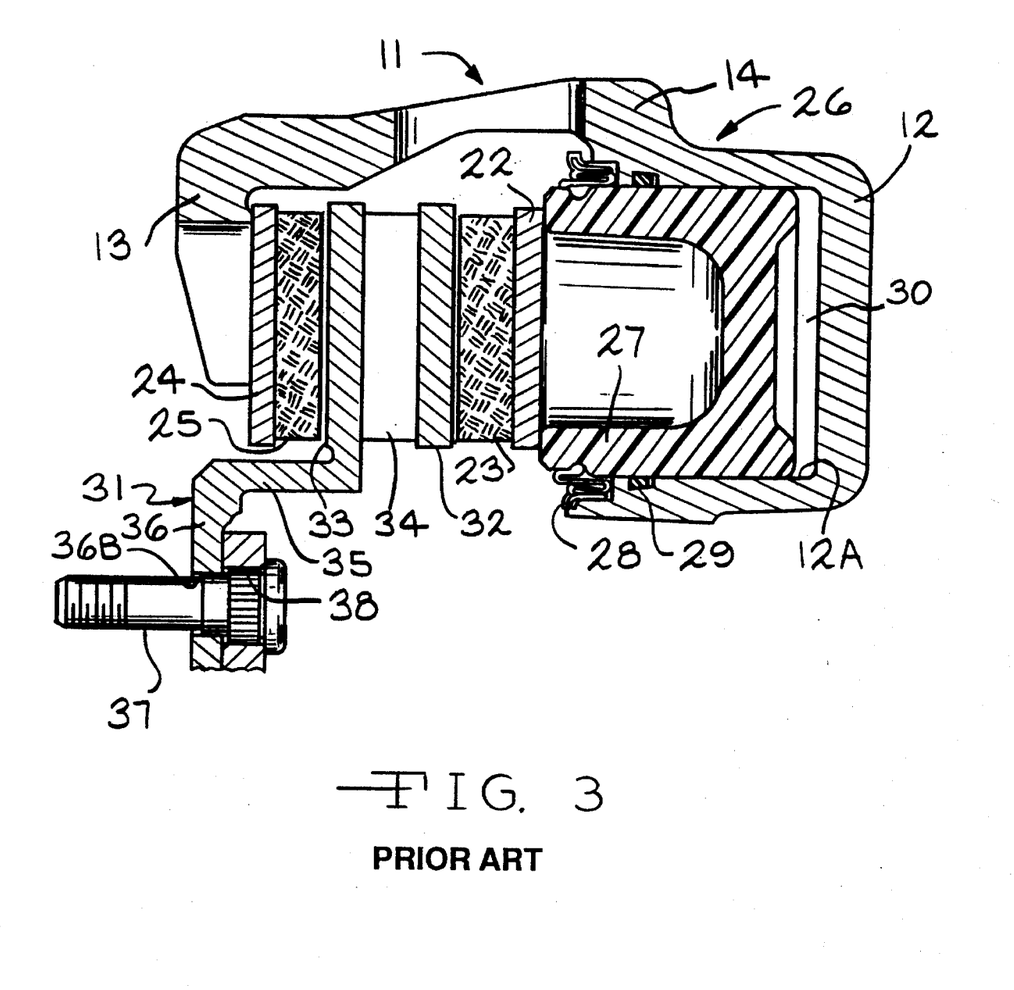
FIG. 3 is a sectional elevational view of a portion of the disc brake assembly illustrated in FIG. 1.

Referring now to the drawings, there is illustrated in FIGS. 1 through 3 a portion of a prior art vehicle disc brake assembly, indicated generally at 10. The general structure and operation of the disc brake assembly 10 is conventional in the art. Thus, only those portions of the disc brake assembly 10 which are necessary for a full understanding of this invention will be explained and illustrated.

The disc brake assembly 10 includes a generally C-shaped caliper, indicated generally at 11. The caliper 11 includes an inboard leg portion 12 and an outboard leg portion 13 which are interconnected by an intermediate bridge portion 14. The caliper 11 is slidably supported on a pair of pins 15 secured to an anchor plate, indicated generally at 16. The pins 15 extend through respective non-threaded apertures 12B formed through the inboard leg 12 of the caliper 11. The pins 15 have threaded ends 15A which are received in respective threaded apertures 16A formed through the anchor plate 16. The pins 15 permit the caliper 11 to slide in both the outboard direction (toward the left when viewing FIG. 3) and the inboard direction (toward the right when viewing FIG. 3). Such sliding movement of the caliper 11 occurs when the disc brake assembly 10 is actuated, as will be explained below. A pair of bolts (not shown) extend through respective non-threaded apertures 16B formed through the anchor plate 16 to secure the anchor plate 16 to a stationary component of the vehicle, such as the steering knuckle (not shown) in a front wheel drive vehicle.

As best shown in FIG. 2, the illustrated anchor plate 16 includes a pair of outwardly extending arms 17 and 18 which are interconnected by an inner tie bar 19. The arms 17 and 18 have respective upstanding guide rails 17A and 18A, respectively formed thereon. The guide rails 17A and 18A extend transverse to the arms 17 and 18 and parallel to one another. The guide rails 17A and 18A are provided to slidably support an inboard brake shoe, indicated generally at 20, and an outboard brake shoe, indicated generally at 21, respectively.

The inboard brake shoe 20 includes a backing plate 22 and a friction pad 23. The opposed ends of the inboard backing plate 22 have notches 22A and 22B formed therein for supporting the inboard brake shoe 20 on the guide rails 17A and 18A of the anchor plate 16. The outboard brake shoe 21 includes a backing plate 24 and a friction pad 25. The opposed ends of the outboard backing plate 24 have notches 24a and 24B formed therein for supporting the outboard brake shoe 21 on the guide rails 17A and 18A of the anchor plate 16. Alternatively, as is known in the art, the inboard brake shoe 20 can be supported on a brake piston (not shown), while the outboard brake shoe 21 can be supported on the outboard leg portion 13 of the caliper 11 (not shown).

An actuation means, indicated generally at 26 in FIG. 3, is provided for effecting the operation of the disc brake assembly 10. The illustrated actuation means 26 includes a piston 27 which is slidably disposed in a counterbore or recess 12A formed in the outboard surface of the inboard leg 12 of the caliper 11. The actuation means 26, shown in this embodiment as being a hydraulic actuation means, is operable to move the piston 27 in the outboard direction within the recess 12A (toward the left when viewing FIG. 3) when operated. However, other types of actuation means 26, such as electrical and mechanical types, can be used.

The disc brake assembly 10 also includes a dust boot seal 28 and an annular fluid seal 29. The dust boot seal 28 is formed from a flexible material and has a first end which engages an outboard end of the recess 12A. A second end of the dust boot seal 28 engages an annular groove formed in an outer side wall of the piston 27. A plurality of flexible convolutions are provided in the dust boot seal 28 between the first and second ends thereof. The dust boot seal 28 is provided to prevent water, dirt, and other contaminants from entering into the recess 12A. The fluid seal 29 is disposed in an annular groove formed in a side wall of the recess 12A and engages the outer side wall of the piston 27. The fluid seal 29 is provided to define a sealed hydraulic actuator chamber 30, within which the piston 27 is disposed for sliding movement. Also, the fluid seal 29 is designed to function as a "roll back" seal to retract the piston 27 within the recess 12A (toward the right when viewing FIG. 3) when the brake pedal is released.

The disc brake assembly 10 further includes a rotor, indicated generally at 31, which is connected to a hub 38 and a wheel (not shown) of the vehicle for rotation therewith. The illustrated rotor 31 is ventilated and includes a pair of opposed friction plates 32 and 33 which are spaced apart from one another by a plurality of intermediate ribs or posts 34 in a known manner. The rotor 31 extends radially outwardly between the inboard friction pad 23 and the outboard friction pad 25. The entire rotor 31, including the two friction plates 32 and 33 and the intermediate ribs 34, may be cast as a single piece.

The rotor 31 further includes an inner mounting flange portion 36 connected to the friction plate 33 by a circumferential wall or hat portion 35. The inner mounting flange portion 36 includes a centrally located pilot hole 36A which defines an axis of rotation for the rotor 31. A plurality of lug bolt receiving holes 36B (six of such lug bolt receiving holes 36B are shown in FIG. 1) are equally spaced circumferentially on the rotor 31 about the pilot hole 36A. A lug bolt 37 extends through a hole 38A provided in a hub 38, and through each of the lug bolt receiving holes 36B for mounting and securing the rotor 31 to the hub 38 and vehicle wheel for rotation therewith.

When it is desired to actuate the disc brake assembly 10 to slow or stop the rotation of the rotor 31 and the vehicle wheel associated therewith, the driver of the vehicle depresses the brake pedal (not shown). In a manner which is well known in the art, the depression of the brake pedal causes pressurized hydraulic fluid to be introduced into the chamber 30. Such pressurized hydraulic fluid urges the piston 27 in the outboard direction (toward the left when viewing FIG. 3) into engagement with the backing plate 22 of the inboard brake shoe 20. As a result, the friction pad 23 of the inboard brake shoe 20 is moved into frictional engagement with the inboard friction plate 32 of the rotor 31. At the same time, the caliper 11 slides on the pins 15 in the inboard direction (toward the right when viewing FIG. 3) such that the outboard leg 13 thereof moves the friction pad 25 of the outboard brake shoe 21 into frictional engagement with the outboard friction plate 33 of the rotor 31. As a result, the opposed friction plates 32 and 33 of the rotor 31 are frictionally engaged by the friction pads 23 and 25. The structure and operation of the disc brake assembly 10 thus far described is conventional in the art.

Figure 4:
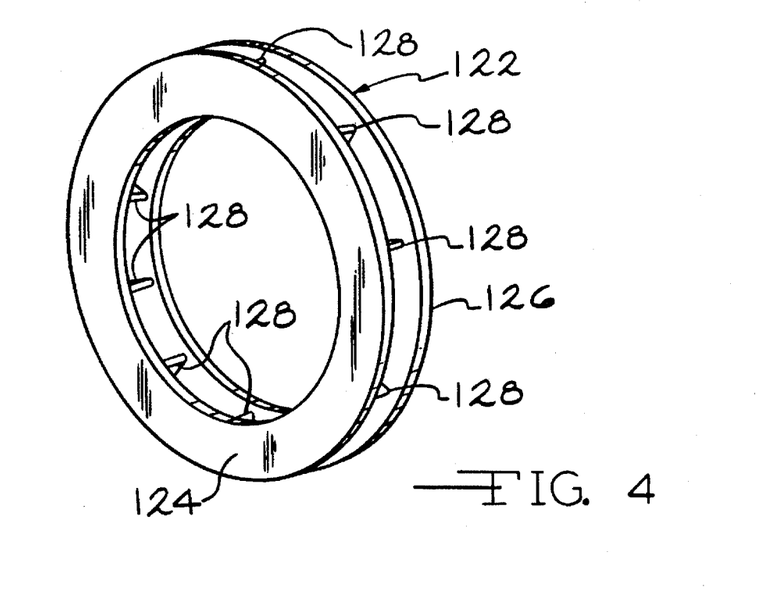
FIG. 4 is a perspective view of a rotor insert for use in a composite disc brake rotor constructed in accordance with the present invention.

FIG. 4 illustrates a perspective view of a rotor insert 122 for use in producing a composite disc brake rotor, indicated generally at 120 in FIG. 4, in accordance with the present invention and which can be used in place of the conventional rotor 31 of the prior art disc brake assembly 10 illustrated in FIGS. 1 through 3. Although the rotor 120 of this invention will be described and illustrated in conjunction with the particular prior art vehicle disc brake assembly 10 structure disclosed herein, it will be appreciated that it may be used in conjunction with other disc brake assembly structures.

In order to produce the generally annular rotor insert 122, a MMC material is cast in a mold (not shown). The casting process can be performed by any suitable casting method, such as die casting, sand casting, permanent mold casting, squeeze casting, or lost foam casting, for example. As will be discussed below, in the preferred embodiment, the rotor insert 122 is of a one-piece construction and includes a pair of integrally cast brake friction plates 124 and 126 which are disposed in mutually spaced apart relationship by a plurality of spacing elements 128.

Figure 5:
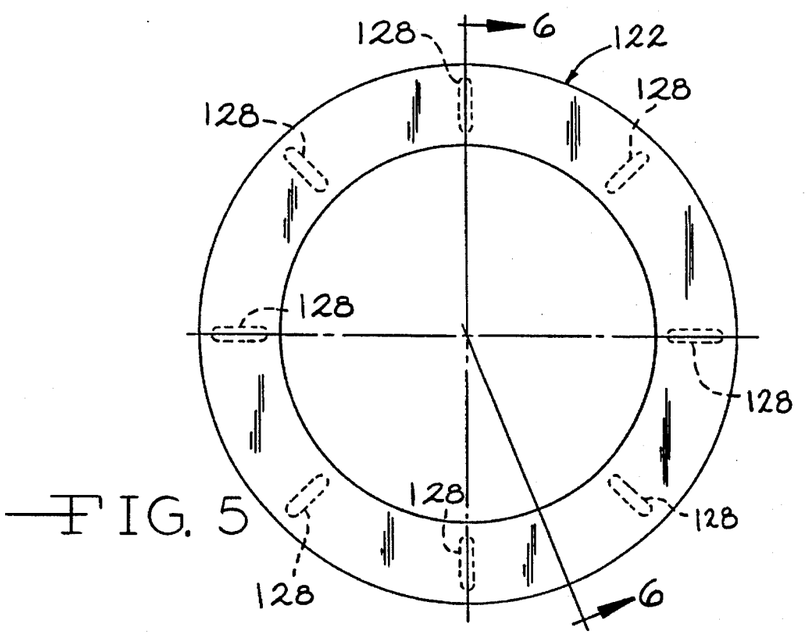
FIG. 5 is a front view of the rotor insert shown in FIG. 4.
Figures 6, 7, 9:
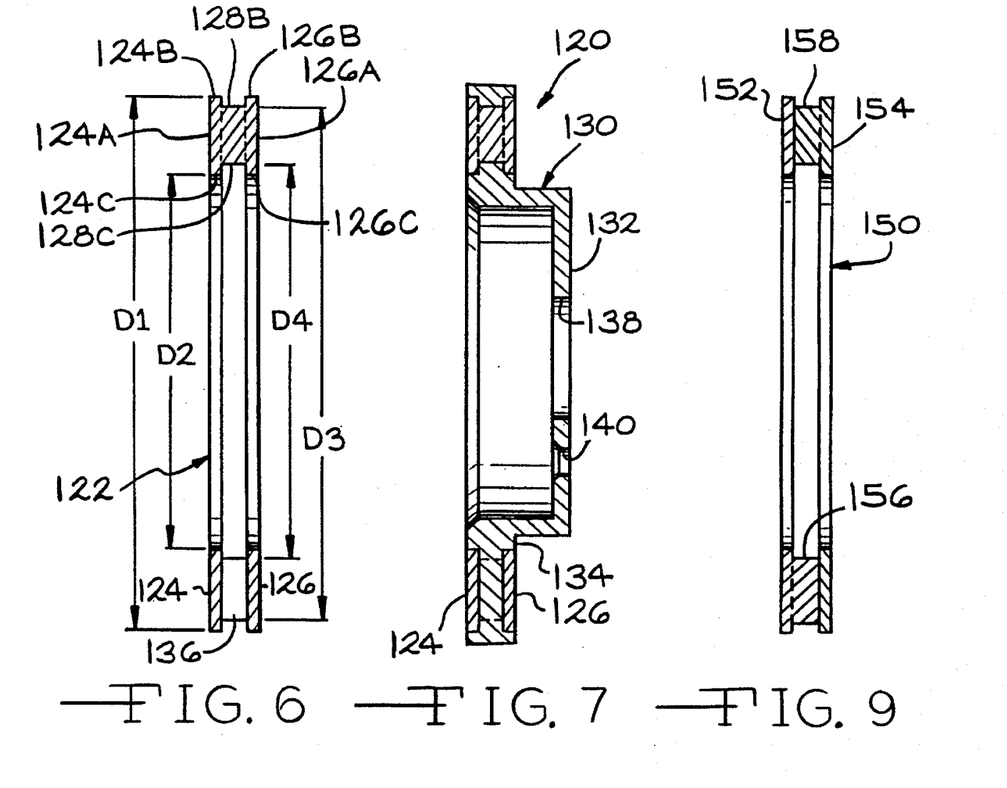
FIG. 6 is a cross sectional view of the rotor insert taken along lines 6—6 of FIG. 5.
FIG. 7 is a cross sectional view of a finished composite disc brake rotor including the rotor insert of FIGS. 4 to 6.
FIG. 9 is a cross sectional view of the rotor insert shown in FIG. 8.
Figure 8:
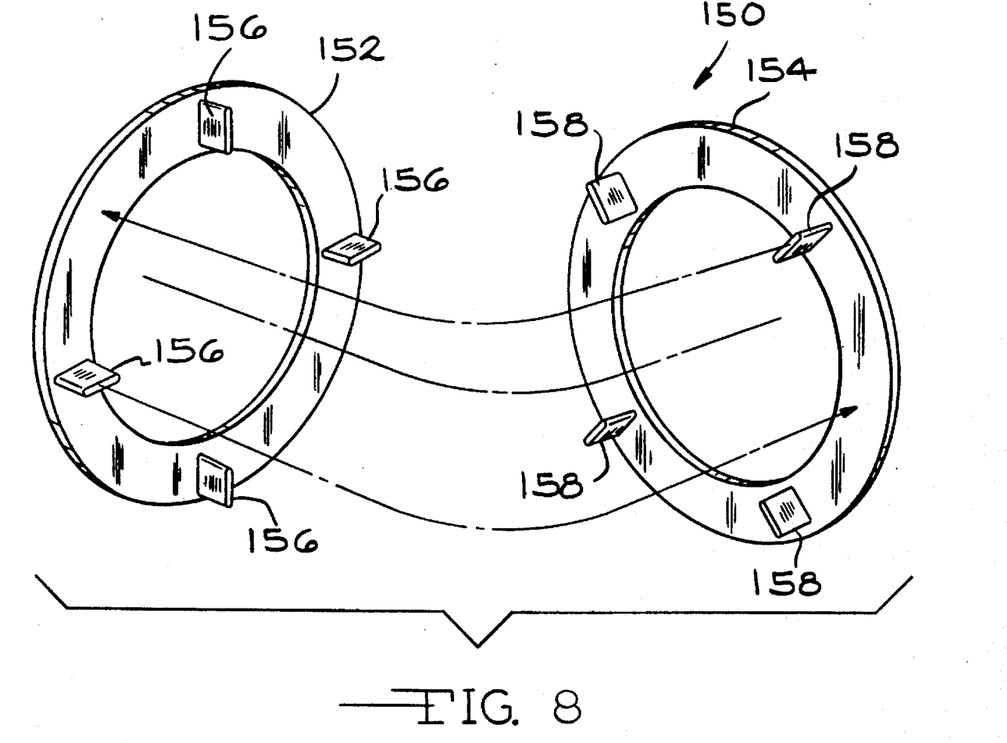
FIG. 8 is a perspective view showing a first alternate embodiment of a rotor insert for use in a composite disc brake rotor in accordance with this invention.

Referring now to FIGS. 5 and 6, the specific construction of the annular rotor insert 122 will be discussed. As shown therein, the annular rotor insert 122 is of a one-piece cast construction but for discussion purposes, can be thought of as including three distinct portions, namely, a pair of spaced apart brake friction plates 124 and 126, and a plurality of spacing elements 128. Between each pair of spacing elements 128 and the plates 124 and 126, there is formed an interspace 136. As will be discussed below, the spacing elements 128 maintain a predetermined spacing between the outer surfaces 124A and 126A of the plates 124 and 126, respectively, while a rotor body is cast in sire therewith. Additionally, the combination of the spacing elements 128 and interspaces improves the mechanical and metallurgical bonds between the rotor insert 122 and the rotor body 130.

As shown in the embodiment of FIGS. 5 and 6, there are eight spacing elements equally spaced circumferentially about the rotor insert 122 which are operative to form eight interspaces 136 between the brake friction plates 124 and 126. The brake friction plates 124 and 126 include outer annular friction surfaces 124A and 126A, respectively, which are located generally parallel to one another.

The friction plates 124 and 126 further include outer peripheral ends 124B and 126B, respectively, which define a plate outer diameter D1, and inner peripheral ends 124C and 126C which define a plate inner diameter D2. Each of the spacing elements 128 includes an outer peripheral end 128B which defines an outer diameter D3, and an inner peripheral end 128C which defines an inner diameter D4.

As shown in the embodiment illustrated in FIGS. 5 and 6, the outer diameter D1 of the friction plates 124 and 126 is greater than the outer diameter D3 of the spacing elements 128. Also, the inner diameter D2 of the friction plates 124 and 126 is less than the inner diameter D4 of the spacing elements 128.

In the preferred embodiment, the base alloy of the MMC is an aluminum alloy, such as for example A356 aluminum, and the particulate reinforcement of the metal matrix is silicon carbide. However, the base alloy of the MMC can comprise other alloys, such as for example, magnesium or titanium alloys. Also, the particulate reinforcement material can comprise other materials, such as for example, alumina, silicon nitride, graphite, ceramics, or other refractory type materials. In addition, in the preferred embodiment, the silicon carbide particulate reinforcement has a generally spheroidal to semi-spheroidal shape which allows the silicon carbide to be readily mixed with the aluminum alloy and form a mixed composite which is castable. However, the shape of the particulate reinforcement can be of other shapes, such as rods, whiskers, or fibers, to name a few. Furthermore, in the preferred embodiment, the volumetric content of the particulate reinforcement in the rotor insert is in the range of 10% to 30% of the total volmetric content of the composite rotor insert.

After the rotor insert 122 is cast, the rotor insert 122 is trimmed to remove any risers and gates, and is placed in a rotor mold. The rotor insert 122 is maintained in the mold in predetermined position by suitable means, such as for example, by the cavity of the mold itself or by projections (not shown) provided on the rotor insert 122. Preferably, after the hot rotor insert 122 is removed from the mold, it is placed in the rotor mold prior to its temperature dropping below a predetermined temperature. This aids in the metallurgical bonding between the rotor insert 122 and the rotor body during the casting process. The particular predetermined temperature is dependent upon the physical properties of the selected aluminum MMC.

Alternatively, if the temperature of the rotor insert 122 has fallen below the predetermined temperature, the rotor insert 122 can be subjected to other methods to aid in the metallurgical bonding between the rotor insert and the rotor body. For example, the rotor insert 122 can be preheated up to a predetermined temperature and/or coated with a preselected material prior to casting the rotor body in situ with the rotor insert. Preferably, the preselected material is a metal, such as tin or zinc, having a melting temperature lower than that of the aluminum and the aluminum MMC, so that the material washes away during casting.

Once the rotor insert 122 is placed in the rotor mold, a generally hat-shaped rotor body (shown at 130 in the finish machined embodiment of FIG. 7), is cast about the rotor insert 122 to form a rough-finished rotor casting (not shown). The casting of the rotor body 130 can be preformed by any suitable casting method, such as die casting, sand casting, permanent mold casting, squeeze casting, or lost foam casting.

Preferably, the hat-shaped rotor body 130 is formed from a conventional aluminum alloy, such as for example 356 aluminum. However, other alloys can be used, for example, magnesium or titanium alloys. As will be discussed below, the rotor body 130 in the embodiment shown in FIG. 7, includes a generally centrally located mounting surface 132, and a radially extending outer annular portion 134 which during casting fills the interspaces 136 defined between the brake friction plates 124 and 126 and the spacing elements 128 of the rotor insert 122 to improve the mechanical and metallurgical bonds securing the rotor insert 122 and the rotor body 130 together.

Next, the rough-finished rotor casting is trimmed and then finish machined to produce the finished aluminum MMC disc brake rotor 120, which is shown in FIG. 7. While not illustrated, the rough-finished rotor casting can be heat treated if so desired prior to finish machining operation.

FIG. 7 shows the construction of the rotor after is has been finish machined. As shown therein, the finished rotor 120 is generally hat-shaped and includes the centrally located mounting surface 132, the outer annular portion 134, and the annular rotor insert 122. The mounting surface 132 includes a centrally located pilot hole 138 formed therein during casting and machined to final dimensions during a finish machining operation, and a plurality of lug bolt receiving apertures 140 (only one aperture 140 shown) equally spaced circumferentially about the pilot hole 138 and formed during the finish machining operation.

In particular, during the finish machining of the rough-finished rotor, the outer surfaces of the rotor, including the friction surfaces 124A and 126A and the lug bolt receiving apertures 140, are finish machined to predetermined specifications. Since the spacing elements 128 maintain the predetermined distance between the outer surfaces 124A and 126A of the plates 124 and 126, respectively, only a minimal amount of the MMC material needs to be removed from the outer surfaces 124A and 126A.

Figure 10:
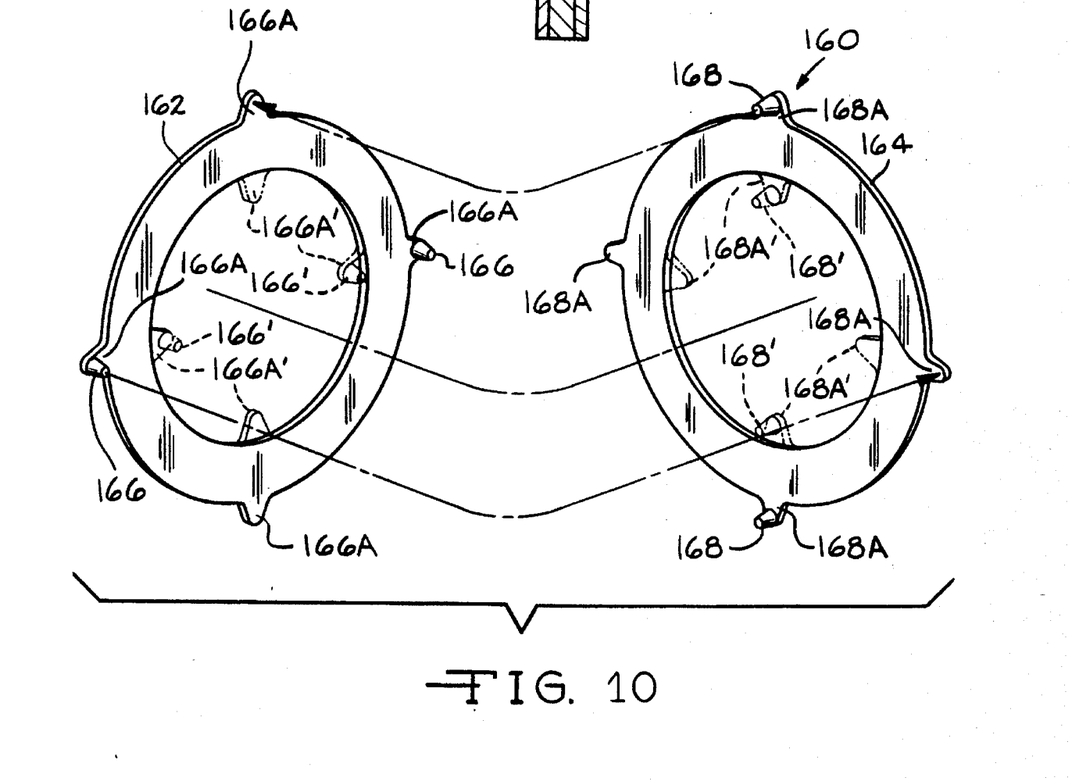
FIG. 10 is a perspective view showing a second alternate embodiment of a rotor insert for use in a composite disc brake rotor in accordance with this invention.

FIGS. 9 and 10 illustrate a first alternate embodiment of a rotor insert, indicated generally at 150, which is similar to the rotor insert 122 of FIG. 3 except that the rotor insert 150 comprises a pair of annular rotor inserts 152 and 154. As shown in this embodiment, the rotor inserts 152 and 154 are identical and include spacing elements 156 and 158, respectively, which are operative to space the rotor inserts 152 and 154 apart from one another by a predetermined distance when the rotor inserts 152 and 154 are placed in the rotor mold.

FIG. 10 illustrates a second alternate embodiment of a rotor insert, indicated generally at 160, which is similar to the rotor insert 150 of FIGS. 9 and 10. As shown in this embodiment, the rotor insert 160 includes a pair of rotor inserts 162 and 164 which are identical and include respective radially outwardly extending mounting pads 166A and 168A provided on the outer diameter thereof. Spacing elements 166 and 168 are provided on mounting pads 166A and 168A, respectively. In the illustrated embodiment, each rotor insert 162 and 164 includes four respective mounting pads 166A and 168A and two spacing elements 166 and 168. Alternatively, the rotor inserts 162 and 164 can include mounting pads 166A' and 168' provided on the inner diameter thereof and associated spacing elements 166' and 168' as shown in phantom in FIG. 10.

Figure 11:
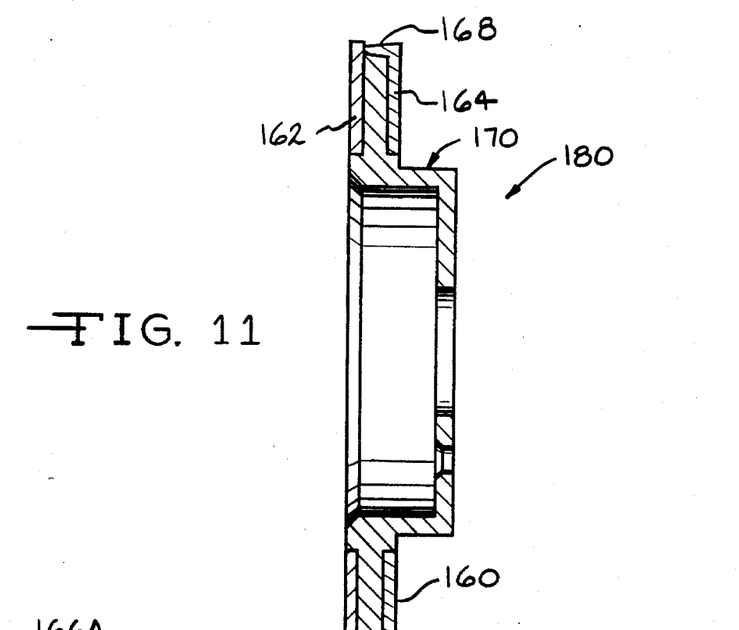
FIG. 11 is a cross sectional view of an an-cast composite disc brake rotor including the rotor insert of FIG. 10.

The spacing elements 166 and 168 are operative to space the rotor inserts 162 and 164 apart from one another by a predetermined distance when the rotor inserts 162 and 164 are placed in the rotor mold and a generally hat-shaped rotor body 170 is cast about the rotor insert 122 to form an as-cast rough-finished rotor casting, indicated generally at 180 in FIG. 11.

One advantage of the present invention is that the spacing elements are operative to space the brake friction plates a predetermined distance apart from one another. As a result of this, the outer surfaces of the brake friction plates are maintained the predetermined distance apart from one another while the casting of the rotor body in situ therewith. This enables less MMC material to be used to cast the rotor insert, and thus reduces the amount of machining required during the finish machining operation. Another advantage of the present invention is that the spacing elements improve both the metallurgical and mechanical bonds by securing the rotor insert relative to the rotor body in both the axial and radial directions.

While the invention has been illustrated and described as forming the rotor insert 122, the rotor inserts 152 and 154, or the rotor inserts 162 and 164 with the particular shape, spacing, and number of respective spacing elements 128, 156 and 158, and 166 and 168, the specific structure can vary. For example, the shape, spacing, and number of the spacing elements 128, 156 and 158, and 166 and 168 can be varied depending upon various design considerations, such as for example, the size of the rotor. Also, while the rotor body has been shown and described as producing a full cast rotor, shown in FIGS. 7 and 11, the rotor body can produce a rotor having an internal hub (not shown).

In addition, while the rotor inserts 152 and 154 shown in FIGS. 5 and 6 and the rotor inserts 162 and 164 shown in FIGS. 10 and 11 and have been described and illustrated as being identically formed, other variations are possible. For example, one of the rotor inserts can include more of the spacing elements than the other one, or only one of the rotor inserts can include the spacing elements the other one not indicating any such elements. Also, neither of the rotor inserts can include any spacing elements formed thereon. In this case, spacers would be provided and placed in the rotor mold to space the rotor inserts apart from one another prior to casting the rotor body in the rotor mold.

Also, while the rotor of this invention has been illustrated and described in connection with a "sliding" caliper type of disc brake assembly, the invention may be used with other types of brake assemblies. For example, the invention may be used in connection with a "fixed" caliper type of disc brake assembly (not shown), or may be used in connection with a drum-in-hat type of disc brake assembly (not shown), wherein the disc brake assembly includes a disc service brake and a drum parking and emergency brake.

In accordance with the provisions of the patent statutes, the principle and mode of operation of this invention have been described and illustrated in its preferred embodiment. However, it must be understood that the invention may be practiced otherwise than as specifically explained and illustrated without departing from its spirit or scope.

What is claimed is:

1. A method for producing a solid composite disc brake rotor adapted for use in a disc brake assembly having a pair of friction pads comprising the steps of:

(a) casting a generally annular rotor insert formed from a first material, the rotor insert including a pair of brake friction plates and a plurality of circumferential spacing elements, the brake friction plates including inner surfaces and generally parallel outer surfaces which define a pair of brake friction surfaces adapted to be frictionally engaged by the pair of friction pads of the disc brake assembly, the circumferential spacing elements disposed and extending only between the inner surfaces of the brake friction plates for maintaining the brake friction plates in a spaced apart relationship, a plurality of interspaces being defined between the circumferential spacing elements, (b) placing the rotor insert in a mold; and (c) casting a rotor body formed from a second material in situ therewith, the rotor body including a mounting surface and an annular portion extending directly through the interspaces and completely filling and occupying the interspaces to secure the rotor insert to the rotor body.

2. The method for producing the rotor defined in claim 1 wherein step (a) includes providing a one piece rotor insert.

3. The method for producing the rotor defined in claim 1 wherein step (a) includes providing a two piece rotor insert.

4. The method for producing the rotor defined in claim 1 wherein step (a) includes a rotor insert formed from a metal matrix composite and step (b) includes casting a rotor body formed from an aluminum alloy material.

5. A method for producing a solid composite disc brake rotor adapted for use in a disc brake assembly having a pair of friction pads comprising the steps of:

(a) casting a generally annular rotor insert formed from an aluminum based metal matrix composite, the rotor insert including a pair of brake friction plates and a plurality of circumferential spacing elements, the brake friction plates including inner surfaces and generally parallel outer surfaces which define a pair of brake friction surfaces adapted to be frictionally engaged by the pair of friction pads of the disc brake assembly, the circumferential spacing elements disposed and extending only between the brake friction plates for maintaining the brake friction plates in a spaced apart relationship, a plurality of interspaces being defined between the circumferential spacing elements;

(b) placing the rotor insert in a mold; and (c) casting a rotor body formed from an aluminum alloy material in situ therewith, the rotor body including a mounting surface and an annular portion extending directly through the interspaces and completely filling and occupying the interspaces to secure the rotor insert to the rotor body.

6. The method for producing the solid composite disc brake rotor disc brake rotor defined in claim 5 wherein step (a) includes providing a rotor insert formed form an aluminum based metal matrix composite having a particulate reinforcement selected from the group consisting of silicon carbide, alumna, silicon nitride, and ceramics.

7. The method for producing the solid composite disc brake rotor disc brake rotor defined in claim 6 wherein the volumetric content of the particulate reinforcement is in the range of from 10% to 30% of the total volumetric content of the rotor insert.

8. The method for producing the solid composite disc brake rotor defined in claim 5 wherein step (a) includes providing a one piece rotor insert.

9. The method for producing the solid composite disc brake rotor defined in claim 5 wherein step (a) includes providing a two piece rotor insert.

* * * * *